United States Patent [19]

Sommer

[11] Patent Number: 4,506,772

[45] Date of Patent: Mar. 26, 1985

[54] MODULAR ACCESORIES FOR CLUTCH/BRAKE UNIT

[75] Inventor: Gordon M. Sommer, Boca Raton, Fla.

[73] Assignee: Sommer Co., Warren, Mich.

[21] Appl. No.: 403,299

[22] Filed: Jul. 30, 1982

[51] Int. Cl.³ .................. F16D 67/04; B60K 17/28; B60K 41/24

[52] U.S. Cl. .................. 192/18 A; 192/112; 74/15.6; 74/606 R

[58] Field of Search .................. 192/112, 115, 18 R, 192/18 A, 13 R, 4 A, 4 C; 74/700, 745, 665 F, 665 S, 665 T, 15.2, 15.6, 606 R, 665 H; 29/463, 469

[56] References Cited

U.S. PATENT DOCUMENTS

| | | | |
|---|---|---|---|
| 2,445,417 | 7/1948 | Bohannon | 74/15.6 |
| 2,797,785 | 7/1957 | Earnhardt et al. | 192/112 X |
| 3,130,605 | 4/1964 | Kennedy | 74/745 |
| 3,246,725 | 4/1966 | Brashear | 192/112 X |
| 3,381,770 | 5/1968 | Fauchere | 192/4 C |
| 3,382,735 | 5/1968 | Gatiss | 74/745 X |
| 3,645,147 | 2/1972 | Fodrea | 74/745 X |
| 3,799,002 | 3/1974 | Richards | 74/745 |
| 3,864,990 | 2/1975 | Lacoste | 74/745 X |
| 3,924,715 | 12/1975 | Cory | 192/18 A |
| 4,082,156 | 4/1978 | Krolak | 192/13 R |

Primary Examiner—George H. Krizmanich
Attorney, Agent, or Firm—Harness, Dickey & Pierce

[57] ABSTRACT

A system for modifying the operation of an oil submerged clutch/brake unit comprising at least one accessory adapted to be capable of integration with the unit and at least one station on the unit including an arrangement for mounting the accessory to the housing with access by the accessory to at least communicate with the interior of the housing, wherein the accessory is adapted to be capable of modifying the operation of the clutch/brake unit. The accessories may include an inching drive, a reversing drive, and other accessories.

11 Claims, 3 Drawing Figures

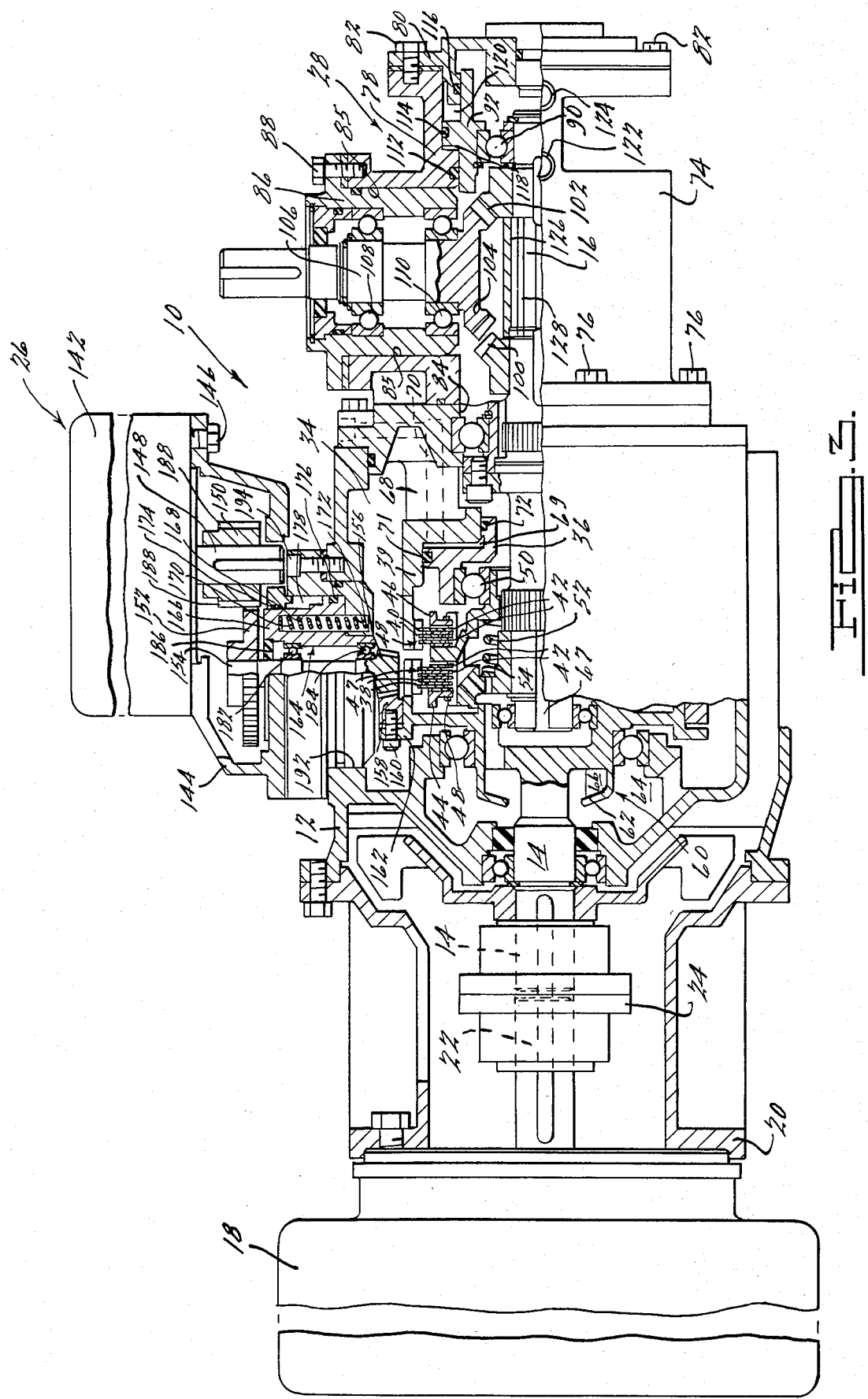

MODULAR ACCESORIES FOR CLUTCH/BRAKE UNIT

BACKGROUND AND SUMMARY OF THE INVENTION

The present invention relates generally to a combination clutch/brake unit of the type described in applicant's U.S. Pat. No. 3,696,898, issued Oct. 10, 1972, and more particularly, to a system of modular accessories for a clutch/brake unit.

Oil submerged clutch/brake units have filled a substantial need in the industry and having improved the wear characteristics and lessened the down time of clutch/brake units in industrial applications. These self-contained, oil submerged clutches and brakes, however, have been inhibited in that any accessories had to be coupled via the input or output shafts to limit the usefulness of the clutch/brake unit to solely one function at a time until the accessory was removed from the shaft and replaced on the same shaft by another accessory. Furthermore, expensive reversing motors and inching motors have been needed to provide reversing or inching functions, which motors had to be shifted around as the function of the units changes, and, in addition, each had to be coupled by means of a shaft to shaft coupling to the clutch/brake unit.

With the present invention, a unidirectional drive motor is the only accessory that need be directly mounted to the input shaft, which is a much less expensive option than a reversible drive motor. Modular accessories may be attached to the housing of the clutch/brake unit and integrated into the unit either externally or by an extension of the housing to utilize not only the oil cooling capability of the unit but also to integrate the operation so that a great efficiency may result. Furtheremore, the accessories are mountable at stations which may be sealed and capped when not in use so that notching inhibits any of the basic functions of the clutch/brake unit as it presently exists.

Thus, one object of the present invention is to provide a system of modular attachments for a clutch/brake unit which act as integrated accessories to modify and increase the capabilities of the clutch/brake unit without inhibiting the basic capability of the unit. The stations of the system represent mounting locations which may have access into the oil submerged area of the clutch/brake unit.

Further objects of the present invention are to provide a new and improved clutch/brake unit of the character described which is simple and compact in design, economical to produce and operate, extremely rugged in maintenance-free during operation, and still have input and output shafts that are readily adaptable for direct mounting thereon of any type of machine member such as fly wheels, gears, sheaves, couplings, sprockets, etc.

Other objects and advantages of the present invention will become apparent from the following detailed description taken in conjunction with the accompanying drawings.

BRIEF DESCRIPTION OF THE DRAWINGS

FIG. 3 is a side sectional view of the clutch/brake unit and accessories of FIG. 2.

DETAILED DESCRIPTION OF THE PREFERRED EMBODIMENT

Figure 1:
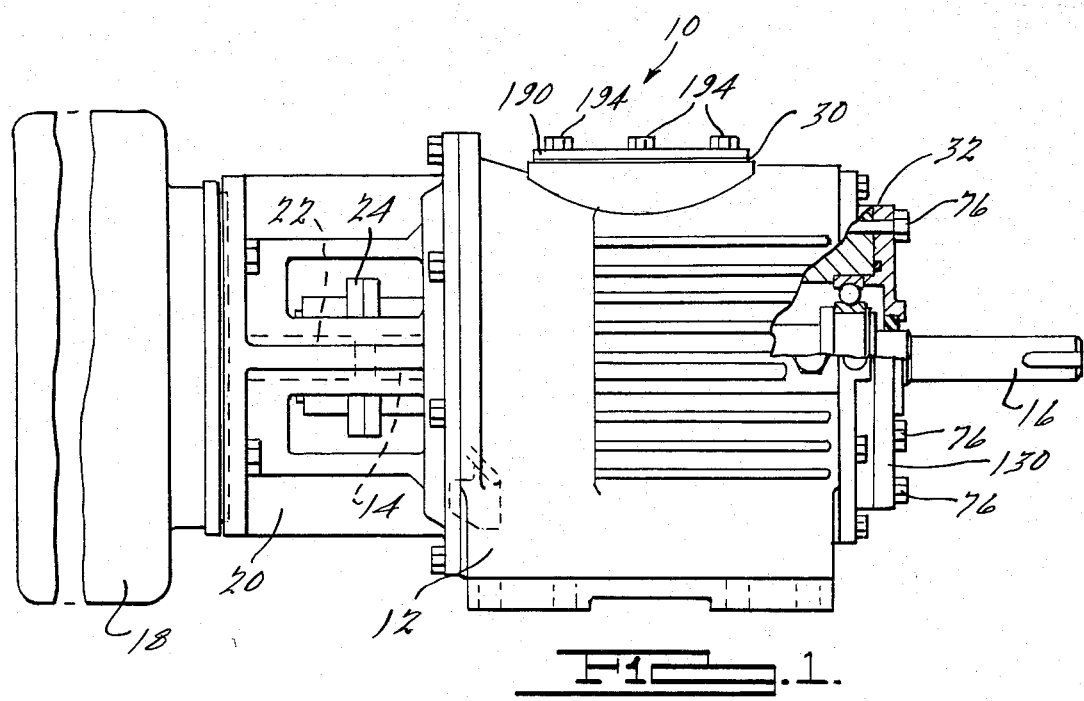
FIG. 1 is an elevated side view of a basic clutch/brake unit having drive means attached thereto.
Figure 2:
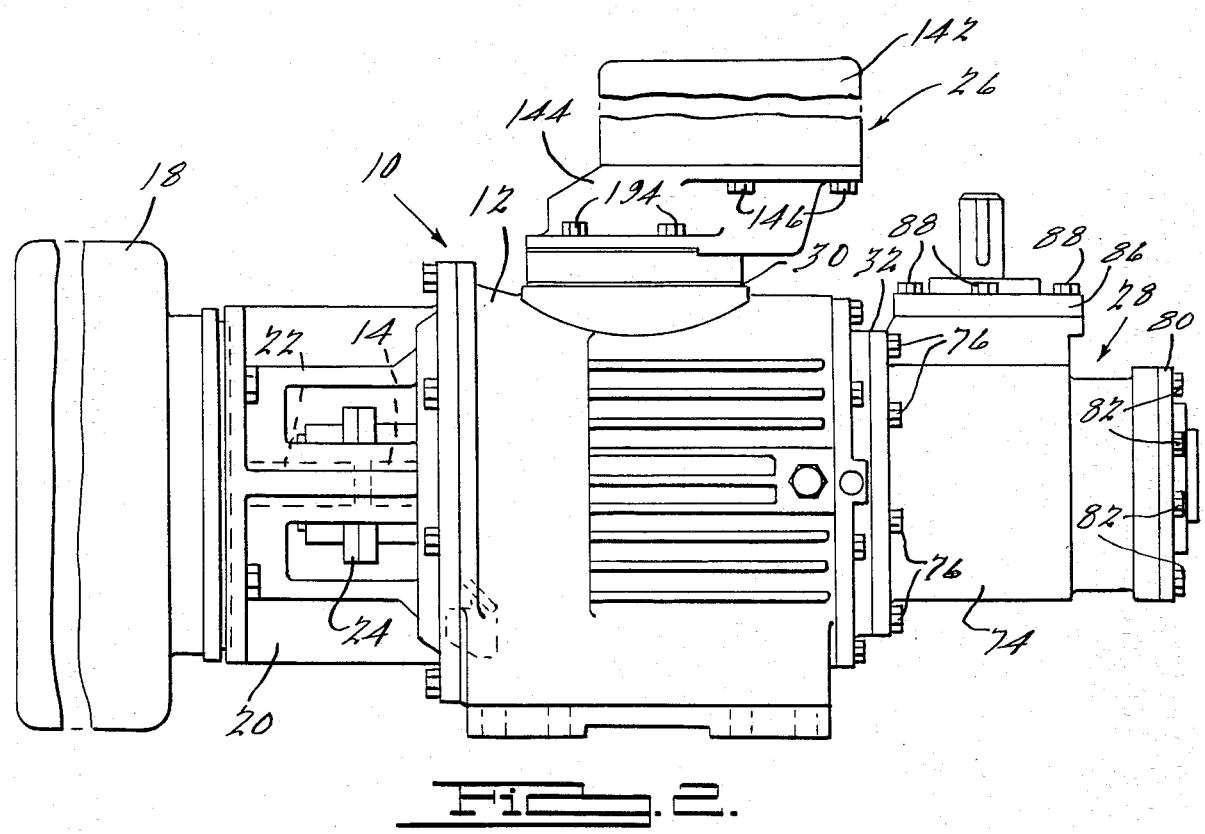
FIG. 2 is a side elevational view of a clutch/brake unit of the present invention having an inching drive and reversing drive as modular accessories attached thereto.

Referring to FIGS. 1 and 2, a clutch/brake unit 10 of the present invention is illustrated having a housing 12, an input shaft 14 and a main drive shaft 16. A drive motor 18 is affixed to the housing by means of support housing 20 and has an output shaft 22 which is associated with the input shaft 14 by means of a coupling 24. An inching drive mechanism 26 or a reversing drive 28 may be operably secured at stations 30 or 32, respectively, as desired. The stations 30 and 32 each comprise an access opening to the interior chamber 34 (FIG. 3) formed by the housing 12 and mounting locations as will be described hereafter.

Referring to FIG. 3, a clutch/brake unit 10 is illustrated similar to that described in applicant's U.S. Pat. No. 3,696,898, issued Oct. 10, 1972. The clutch/brake unit 10 is further comprised of a non-rotatable pneumatically actuated piston 36 in the housing 12, a series of radially disposed clutch plates 38 mounted for rotation with the input shaft 14, a series of radially disposed brake plates 40 spaced axially from the clutch plates 38 and non-rotatably attached to an axially extended portion 39 of the housing 12, a series of friction discs 42 mounted on the main drive shaft 16 for rotation therewith and adapted for selective frictional engagement with the clutch 38 or brake plates 40, a fixed clutch actuating member 44 and a fixed brake actuating member 46 carried on the main drive shaft 16 adjacent the clutch 38 and brake plates 40, securement bolts 48 extending between the last two fixed members 44 and 46, whereby the members 44 and 46 are fixed together axially of the main drive shaft, and a bearing 50 disposed between the piston 36 and the movable clutch and brake actuating member 46, through which the piston 36 actuates the clutch 47 or brake 48. Movement of the piston 36 in one direction serves to move the actuating member 46 to simultaneously frictionally engage the clutch plates 38 with certain of the friction discs 42 and to release the remaining friction discs 42 from frictional engagement with the brake plates 40, and movement of the piston 36 in the other direction serves to move the actuating member 46 to simultaneously release the clutch plates 38 from the frictional engagement with certain friction discs 42 and to frictionally engage the remaining friction discs 42 with the brake plates 40. Springs 52 are mounted in recesses 54 at one end of the housing 12 to normally urge the piston 36 toward a position wherein the springs 52 effect engagement of the brake 48 and release of the clutch 47. A pumping mechanism 60 is disposed on the input shaft 14 having a centrifugal pump 62 rotatable with the shaft 14 in a chamber 64. The pump 62 has vanes 66 at the outer periphery thereof to direct the fluid into an oil cooler (not shown) and into the oil delivery system of the clutch/brake unit 10 (as described in applicant's above-referenced patent), such as to passageways 67, 68. The piston 36 is driven pneumatically by pressurized air being fed to annular chamber 69 via passageway 70. The chamber 69 is appropriately sealed by seals 71 and 72.

The main drive shaft 16 may extend into a second housing 74 for the reversing drive mechanism 28 which housing 74 is fixedly secured to the clutch/brake housing 12 by a series of circumferentially spaced bolts 76. The housing 74 is comprised of an annular sidewall 78 and an end portion 80 secured to the sidewall by a series of circumferentially spaced bolts 82. The sidewall 78 may be open at one end adjacent the access opening 84 of the clutch/brake unit 10 to receive oil from the interior chamber or may, as shown, receive oil via a passage 67 in the shaft 16. The annular housing sidewall 78 has an aperture 85 therein through which an extended, radially outwardly directed housing portion 86 is inserted in and secured to the housing sidewall 78 by a series of circumferentially spaced bolts 88. The annular housing sidewall 78 further comprises a bearing 90 at an intermediate location of the output shaft 16 secured to the annular housing sidewall 78 via a movable piston 92.

The main drive shaft 16 has a pair of annular beveled gears 100 and 102 disposed to face one another at spaced apart locations. The gears 100 and 102 are spaced apart far enough so that a beveled pinion gear 104 may engage only one or the other of the gears 100 or 102 when disposed at right angles thereto. The beveled pinion gear 104 is disposed on the output shaft 106 of the reversing drive unit 28, which output shaft 106 is rotatably secured within the extended housing portion 80 by bearings 108 and 110.

The piston 92 is sealingly engaged within the annular housing sidewall 78 by seals 112, 114, and 116 to provide two annular chambers 118 and 120. Chambers 118 and 120 communicate with ports 122 and 124 respectively. As air is alternately fed to one of the two ports 122, 124, the piston 92 is forced in one direction or the other. The spaced apart beveled gears 100, 102 on the main drive shaft 16 are secured together by an intermediate portion 126 which is slideably disposed on splines 128 integral with the main drive shaft 16, which intermediate portion 126 is driven by the piston 92. Thus, the direction of rotation is determined by which of the two ports 122 or 124 is fed compressed air to force the intermediate portion 126 (and gears 100 and 102) to the right or to the left (as illustrated) and engage the respective annular beveled gear 100, 102 to rotate the beveled pinion gear 104 and shaft 106 in one direction or the other relative to the single direction that the main drive shaft 16 is rotated.

It can also be clearly seen from the above disclosure that the reversing drive mechanism 28 may be operably associated between the drive motor and an extended input shaft 14 of the clutch/brake unit 10. Referring to FIG. 1, if the reversing drive 28 is not utilized with the clutch/brake unit 10, a cap 130 with appropriate sealing (such as a gasket or the like) is placed over the access opening of station 32 and secured to the clutch/brake unit 10 by the same circumferentially spaced bolts 76 that are used to secure the reversing drive 28 to the unit 10.

As illustrated, an inching drive mechanism 26 is mounted at a second station 30 on the housing 12. The inching drive mechanism 26 comprises an inching motor 142 and housing 144 which are mounted together by bolts 146.

Referring to FIG. 3, the motor 142 has an output shaft 148 extending into the housing 144 upon which is mounted a gear 150. The gear 150 meshes with a second drive gear 152 mounted on a shaft 154 disposed parallel to the output shaft 148 of the motor 142 and perpendicular to the input 14 and main drive 16 shafts of the clutch/brake unit 10. The opposite end of the shaft 154 has a beveled pinion gear 156 secured thereto which is engageable with an annular rack gear 158 secured by a plurality of bolts 160 to a radially outwardly extending portion 162 of the input shaft 14 of the clutch/brake unit 10.

Also disposed within the housing 144 is an actuation mechanism 164 for the inching mechanism 26 which comprises an annular piston 166 having a series of recesses 168 in which are disposed springs 170, the other end of which springs 170 are disposed in recesses 172 within the housing 144. The housing 144, annular piston 166, and upper 174 and lower 176 seals form an air chamber 178. The annular air chamber 178 is fed pneumatically to dispose the annular piston 166 in a downward direction from its pre-actuation position as pre-loaded by the springs 170.

The drive shaft 154 is connected to the annular piston 166 by means of two roller bearings 182, 184 and a seal 186 which maintains the chamber formed by the housing 144 separate from the chamber formed by the housing 12 on the clutch/brake unit 10.

In operation, the piston 166 is set in its normal position vertically upwardly disposed by the preload of the springs. Thus the beveled pinion gear 156 is disposed upwardly out of contact with the annular beveled rack gear 158. Upon pneumatic actuation, the piston 166 is driven vertically downwardly to bring the pinion gear 156 into contact with the beveled rack gear 158. The second drive gear 152 is always in contact with the first pinion drive gear 150 and slides along the splines 188 thereof. At this point, the inching motor 142 is actuated to drive the input shaft 14 of the clutch/brake unit, and the clutch 58 of the clutch/brake unit is actuated so that the input shaft 14 drives the main drive shaft 16 of the clutch/brake unit 10 and thereby any accessory mounted to that shaft 16.

As in the case of the reversing drive unit 28 described above, it can be seen from FIGS. 1 and 2 that if the inching drive 26 is not desired to be utilized with the clutch/brake unit 10, a cap 190 with appropriate sealing (such as a gasket or the like) is placed over the access opening 192 of station 30 and may be secured to the clutch/brake unit 10 by the same circumferentially spaced bolts 194 that are used to secure the inching drive 26 to the unit 10. With or without the inching drive 26 in place, a drive motor may remain secured to the input shaft 14 of the clutch/brake unit 10. The inching drive 26 may be added or removed to the unit 10 at any time during the life of the clutch/brake unit 10.

While it will be apparent that the preferred embodiment as illustrated herein is well calculated to fulfill the object above stated, it will also be appreciated that the present invention is susceptible to modification, variation and change without departing from the proper scope or fair meaning of the subjoined claims.

I claim:

1. In an oil submerged clutch/brake unit having an exterior housing with an interior chamber, a drive element, torque retarding means, and torque transmission means including a driven element, a modular system for modifying the torque transmission means of the unit comprising a drive motor attached to said drive element, first and second accessories removably integrated with said unit by attachment means for each of said first and second accessories, and at least two stations on said unit including means for mounting one of said accessories to said housing at each said station and means for permitting access of each said one accessory at each said station to at least communicate with the interior chamber of said housing, wherein said system further includes means for actuating each said accessory to modify the torque transmission means of the clutch/brake unit by selectively acting directly in association with one of said drive element or said driven element.

2. A system in accordance with claim 1, wherein said actuating means of each accessory permits each accessory to modify the torque transmission means of the unit independently of actuation of any other accessory.

3. In a clutch/brake unit comprising a housing having an interior oil chamber, an input shaft and interrelated torque transmission and retarding means comprising a second shaft, non-rotatable pneumatically actuated piston means disposed within said housing, a series of radially disposed clutch plates disposed in said chamber and mounted for rotation with said input shaft, a series of radially disposed brake plates disposed in said chamber, spaced axially from said clutch plates, and non-rotatably attached to said housing, a series of friction discs disposed in said chamber, mounted on said main drive shaft for rotation with said second shaft, and interleaved with said clutch and brake plates for selective frictional engagement with said clutch and brake plates, and means driven by said piston for actuating a clutch by engaging said clutch plates with said friction discs or actuating a brake by engaging said brake plates with said friction discs, a system for modifying the torque transmission and retarding means of the unit comprising a drive motor attached to said input shaft and first and second accessories each integrating its respective function with the torque transmission and retarding means of the unit by each operably associating with one of said shafts via connecting means, and at least two stations on said unit including means for mounting at least one of said accessories to said housing for each said station and means for permitting access of each of said accessories disposed at each said station with the interior chamber of said housing to at least communicate with the interior chamber of said housing wherein the accessories are selectively operated when at least two accessories are mounted to the unit to selectively modify the torque transmission and retarding means of the unit.

4. A claim in accordance with claim 3, wherein said access means permits at least a portion of said accessory to be disposed within said interior chamber of said housing.

5. A claim in accordance with claim 3, wherein said system further comprises means for covering said access permitting means when said accessory is not mounted on said unit, said covering means adapted to be capable of being mounted to said mounting means of said at least one station.

6. A claim in accordance with claim 3, wherein one of said accessories comprises inching drive means for said unit.

7. A claim in accordance with claim 3, wherein one of said accessories comprises reversing drive means for said unit.

8. A claim in accordance with claim 7, wherein a further accessory comprises inching drive means for said unit.

9. In a clutch/brake unit comprising a housing having an interior chamber, an input shaft, non-rotatable pneumatically actuated piston means disposed within said housing, torque transmission means comprising a second shaft, a series of radially disposed clutch plates mounted for rotation with said input shaft, a series of friction discs mounted on said second shaft for rotation with said second shaft and interleaved with said clutch plates for selective frictional engagement with said clutch plates, and means driven by said piston for actuating a clutch by engaging said clutch plates with said friction discs and torque retarding means disposed within said housing including a brake and means driven by said piston for actuating said brake, a system for modifying the torque transmission means of the unit comprising a drive motor attached to said input shaft, first and second accessories, each accessory having means for engaging said respective accessory with said unit to integrate the function of said respective accessory with the torque transmission means of said unit such that more than one accessory is capable of acting upon the torque transmission means of the unit at the same time, wherein said unit is selectively drivingly associated with one of said first accessory, said drive unit, or said brake while selectively also permitting said second accessory to be engaged.

10. In a clutch/brake unit comprising a housing having an interior chamber, an input shaft, non-rotatable pneumatically actuated piston means disposed within said housing, torque transmission means comprising a second shaft, a series of radially disposed clutch plates mounted for rotation with said input shaft, a series of friction discs mounted on said second shaft for rotation with said second shaft and interleaved with said clutch plates for selective frictional engagement with said clutch plates, and means driven by said piston for actuating a clutch by engaging said clutch plates with said friction discs and torque retarding means disposed within said housing including a brake and means for actuating said brake, a system for modifying the torque transmission means of the unit comprising a first drive element attached to said input shaft, a second drive element and at least one accessory, each respective drive element and accessory having means for connecting each of said drive elements and said accessory with one of said shafts to selectively integrate the functioning of each said drive element or accessory with one of said shafts, wherein one of said drive elements is engageable when the other drive element is not engaged while said at least one accessory is engageable independently of the engagement of either drive element.

11. A system in accordance with claim 3, wherein one of said accessories is operably associated with said input shaft and one of said accessories is operably associated with said second shaft.

* * * * *

UNITED STATES PATENT AND TRADEMARK OFFICE
CERTIFICATE OF CORRECTION

PATENT NO. : 4,506,772
DATED : March 26, 1985
INVENTOR(S) : Gordon M. Sommer

It is certified that error appears in the above-identified patent and that said Letters Patent is hereby corrected as shown below:

On the title page:

In the title "Accesories" should be -- Accessories --.

Column 1, line 21, following from, "the" should be -- that --.

Column 1, line 26, "changes" should be -- changed --.

Column 1, line 37, "great" should be -- greater --.

Column 1, line 40, "notching" should be -- nothing --.

Signed and Sealed this

Third Day of December 1985

[SEAL]

Attest:

DONALD J. QUIGG

Attesting Officer          Commissioner of Patents and Trademarks